United States Patent Office 3,170,800
Patented Feb. 23, 1965

3,170,800
SWEETENING AGENT AND PROCESS THEREFOR
Morton Pader, West Englewood, and John J. Miles, Jr., Westwood, N.J., assignors to Lever Brothers Company, New York, N.Y., a corporation of Maine
No Drawing. Filed May 16, 1961, Ser. No. 110,333
15 Claims. (Cl. 99—141)

This invention relates to sweetening compositions which have the appearance and use characteristics of granular household sugar, but which have a low caloric value.

Sweetening agents based on combinations of sucrose and synthetic sweeteners such as saccharin or a cyclamate are well known in the art. When these materials are employed in place of sugar, a desired level of sweetness is obtained with a concomitant reduction of caloric intake by virtue of the chemical composition of the product and the smaller volume of product required to obtain the desired level of sweetness. These materials are disadvantageous in household use because the consumer must learn to use smaller volumes of a sweetening composition.

Sweetening compositions based on artificial non-nutritive sweeteners and low calorie extenders are also known in the art. The use of such extenders is undesirable for one or more reasons. Some are quite insoluble and yield turbid dispersions when added to liquids. Others may have a laxative effect. Still others may affect the viscosity of the liquid to which they are added in an undesirable way, and some are difficult to dissolve under some conditions where sugar is readily soluble.

Products have been prepared in the past in which the sweetening power of the non-nutritive sweetener on a volume basis can be adjusted in part by adjustment of the bulk density of the finished product, as described in U.S. Patent 2,876,105. These compositions have been completely dependent upon the use of glucose polymers derived from starch by depolymerization followed by heat polymerization and either a gum or a chemically modified cellulose to strengthen the polymer particles or otherwise modify their physical properties.

It is highly desirable to have a sweetening agent which not only could be used on an equal volume basis with conventional household granulated sugar but which would have the same or superior solubility, would have a minimum of the bitterness associated with cyclamate and saccharin when used in hot or cold beverages, cereal or other foods, and would still have some of the desirable satiety derived from the use of sugar. Such a product would provide those individuals who desire to reduce their caloric intake for health or other reasons with a material which has the attributes of sugar but fewer calories. To make such a product attractive to the consumer, it would have to be low in cost, and therefore simple to prepare from commonly used food ingredients.

It has now been found that an excellent sugar substitute can be prepared by dissolving sucrose, at least one sweetener from the group consisting of the cyclamates and saccharin, and a whipping agent, whipping the solution to provide a foam, drying the foam and subdividing the dried foam to obtain a material having a particle size similar to that of granulated sucrose. In order to insure complete solution of this product, it has also been found advantageous to coat the surfaces of the particles with an edible surface active agent.

The product obtained according to the process of this invention preferably has a bulk density of 0.2–0.4 gram per cc., and on a volume basis a caloric value of approximately 20–40% of household granulated sugar. The material can be used on an equal volume basis for sweetening coffee, tea, grapefruit, etc., and the material has the general appearance of household granulated sugar.

The low caloric sweetener of this invention includes saccharin and any of the cyclamates such as those described in United States Patent No. 2,275,125. Of the various cyclamate salts, it is preferred to use an alkali metal or alkaline earth metal or ammonium salt such as calcium, sodium, potassium and ammonium cyclamate. Cyclamates can be used in mixtures with saccharin if desired.

The artificial sweetening agents are employed at a level sufficient to bring the sweetening power of the composition to the sweetening power of an identical volume of sucrose. It is understood, however, that if desired, either increased or decreased amounts of the artificial sweetening agent may be employed. The combination of sucrose with saccharin or cyclamate reduces the bitterness associated with the use of the two non-nutritive sweeteners, a marked advantage over prior art low calorie sweetening products containing bulk extenders to allow the use of high volumes. Thus, a minimum of bitterness was detected when the product of this invention was tasted directly, whereas a pronounced bitterness was apparent when a mixture of saccharin and non-sucrose materials (e.g., 24 Dextrose Equivalent corn syrup) containing the same weight percentage of saccharin was tasted.

The preferred whipping agent employed according to this invention is a partially hydrolyzed casein material. Other materials, such as partially hydrolyzed soy protein, gelatin and various gums, such as gum arabic, guar gum, alginates, and the like, may be used. The important consideration with regard to the selection of an appropriate whipping agent is the ability of the agent to maintain the porous structure of the foam during drying. Mixtures of sodium caseinate and alignate are also suitable in this regard.

While gums, caseinates and the like are functionally suitable for the whipping operation, they are less suitable overall to partially hydrolyzed casein. For example, 1–2% gelatin in conjunction with gums yields a satisfactory foam, but the final product is not as readily soluble as one made with a casein hydrolyzate. Sodium caseinate (0.3–2%) also is satisfactory for whipping, particularly in the presence of 0.1–0.5% algin, but the final product leaves a substantial surface foam when it is dissolved, necessitating the use of relatively large amounts of edible surface active agents. Foams stabilized with algins alone may tend to have excessively large gas pockets resulting in a dried foam which, when comminuted to the desired particle size, has too high a bulk density because the particles do not contain a sufficient amount of finely entrapped air.

The foam preferably has an overrun of 300 to 350% calculated as percent occluded gas per weight of foam according to the following formula:

$$\frac{\text{Volume of occluded gas per weight of foam} \times 100}{\text{weight of foam}} = \text{percent overrun}$$

Its structure must be fine-celled, like whipped cream, rather than coarse-celled like a sponge, to ensure foam stability during dehydration and proper structure after dehydration.

The introduction of finely divided bubbles of a gas which does not react with the components of the mixture may be used to facilitate foam formation. Whipping is accomplished by conventional means; equipment for this purpose is commercially available. A Hobart mixer fitted with a wire whip, for example, is satisfactory, as are foaming devices such as used for the continuous production of cake batters.

It may be seen that it is important that the whipping agent be employed at a minimum level in order to reduce the amount of extraneous material present in the composition to as low a level as possible. Certain whipping agents contribute to the formation of a stable foam on the surfaces of food in which the composition may be dissolved. While this foam is considerably reduced and in most cases avoided by the use of a suitable surface active agent, it is preferable that the problem be minimized by the use of as low a level of the whipping agent as possible. In the case of the preferred partially hydrolyzed casein, a level of 0.1-0.2% based on the solids content of the composition may be employed with excellent results.

The drying of the foam must be carefully controlled. The conditions must never be such that caramelization of the sugar occurs. On the other hand, foam layer thickness, temperature, pressure and other factors may be controlled to yield optimal rates of drying.

While the optimal conditions will vary depending on drying facilities and foam properties, they must be such that when the water is removed the sugar is preferably in a crystalline state. Thus, the final product under the microscope appears to be a tightly bound agglomerate of sugar crystals in contact with each other at only a few points, the major volume of each particle being occupied by air. Conditions conductive to dehydration to an amorphous product, e.g. rapid drying at temperatures over about 300° F., are preferably avoided, although such amorphous products eventually can become crystalline on storage.

Any convenient means may be used to comminute the dried foam to the desired particle size. Of course, the extent of comminution determines in part the bulk density of the final sugar substitute, and means should be used which provide a maximum percentage of particles in the desired size range as well as a minimum of very fine particles. A gentle mill in conjunction with a particle classifying device is quite suitable. Excessively large particles are returned to the mill for further comminution while particles of the proper size are drawn off for further processing. The very fine material can be returned to the next batch of ingredients prior to converting it to a foam.

Edible surface active agents, as used in compositions of this invention, reduce the tendency of the composition to float on the surface of liquids to which the composition has been added, and also prevent the formation of a foam or scum on the surface of food attributed to the whipping agent. It is preferred that the surface active agent be applied to the surface of the dry foam granules because of its greater effectiveness in this location.

A preferred edible surface active agent is a water-dispersible mono-diglyceride mixture. Any animal or vegetable fat or oil may be used as the source of the mono-diglyceride mixture. Other food-grade surface active agents which are well known in the art may also be employed.

As the finished product sometimes exhibits a tendency to cake during storage, it has been found helpful to include an edible anti-caking agent in the product. One such agent which has been found to be suitable is sodium alumino silicate.

The following example will serve to further illustrate the invention.

*Example 1*

A sugar substitute was prepared having the following composition.

Ingredient: Percent
Sugar _____ 99.095
Casein hydrolyzate (partial) _____ .200
Saccharin _____ .600
Mono-diglyceride mixture derived from cottonseed oil _____ .005
Sodium alumino silicate _____ .100

The composition was prepared by dissolving the sugar, casein hydrolyzate and saccharin in an amount of water sufficient to provide a nearly saturated sugar solution. The solution was then mechanically whipped to an overrun of about 250-350%. The resulting foam was spread on trays to a depth of ½ inch and dried in a hot-air oven at about 140° F.

The dried foam was comminuted and classified according to particle sizes. That portion of the material having a particle size similar to that of household granulated sugar was retained. The finer material was set aside for reprocessing in a subsequent batch. This utilization of fines is advantageous in reducing the cost of the entire operation.

The mono-diglyceride mixture was then uniformly sprayed on the surfaces of the granulated material, and sodium alumino silicate was then evenly dispersed throughout the product and the product was packaged.

The product was found to have a bulk density of 0.23 and on a volume basis had about 25% of the caloric value of household granulated sugar.

It will be apparent that the embodiments shown are only exemplary and that various modifications can be made in materials and arrangement within the scope of the invention as defined by the appended claims.

We claim:

1. A sugar substitute consisting essentially of sucrose, modified by not more than about 2% by weight of the composition of an edible whipping agent and a minor amount of at least one sweetener selected from the group consisting of cyclamates and saccharin, the material being in the form of particles having a bulk density of from about 0.2 to about 0.4 gram per cc. and a caloric value of about 20 to 40% of that of granular sucrose on a volume basis.

2. The product of claim 1 containing an edible anti-caking agent.

3. The product of claim 2 wherein the anti-caking agent is sodium alumino silicate.

4. The product of claim 1 wherein the dried particles are coated with an edible surface active agent.

5. The product of claim 1 wherein substantially all the dried particles are in the crystalline state.

6. A sugar substitute consisting essentially of sucrose, modified by about 0.1-0.2% of a partially hydrolyzed casein based on the weight of the entire composition and a minor amount of at least one sweetener selected from the group consisting of cyclamates and saccharin, the material being in the form of particles having a bulk density of from about 0.2 to about 0.4 gram per cc. and a caloric value of about 20 to 40% of that of granular sucrose on a volume basis.

7. A method of preparing a sugar substitute consisting essentially of sucrose modified by not more than about 2% by weight of the composition of an edible whipping agent and a minor amount of at least one sweetener selected from the group consisting of cyclamates and saccharin which comprises: (a) dissolving the sucrose, whipping agent and sweetener in water, (b) whipping the aqueous solution to form a stable foam, (c) drying the foam, and (d) comminuting the dried foam to obtain particles having a bulk density of from about 0.2 to about 0.4 gram per cc. and a caloric value of about 20 to 40% that of granular sucrose on a volume basis.

8. The method according to claim 7 wherein the dried particles are coated with an edible surface-active agent.

9. The method of claim 8 wherein the whipping agent comprises a partially hydrolyzed casein and the surface active agent comprises a mono-diglyceride mixture.

10. The method of claim wherein an edible anti-caking agent is added to the dried foam particles.

11. The method of claim 10 wherein the anti-caking agent is sodium alumino silicate.

12. A method according to claim 7 wherein the finer particles of comminuted dried foam are returned for reprocessing in a subsequent batch.

13. A method of preparing a sugar substitute which comprises: (a) preparing an aqueous solution, the dry solids of which consist essentially of about 99% by weight of sucrose, about 0.1 to 0.2% by weight of a partially hydrolyzed casein whipping agent and at least one sweetener selected from the group consisting of cyclamates and saccharin, (b) whipping the solution to an overrun of about 250–350%, (c) drying the resultant foam, and (d) comminuting the dried foam to provide particles having a bulk density of from about 0.2 to about 0.4 gram per cc. and a caloric value of about 20 to 40% that of granular sucrose on a volume basis.

14. A method according to claim 13 wherein an edible surface-active agent is coated upon the dried particles and an edible anti-caking agent is added to the particles of dried foam.

15. A sugar substitute consisting essentially of about 99% by weight of the composition of sucrose, about 0.1 to 0.2% by weight of a partially hydrolyzed casein whipping agent and at least one artificial sweetener selected from the group consisting of cyclamates and saccharin, the product being in the form of particles having a bulk density of from about 0.2 to about 0.4 gram per cc. and a caloric value of about 20 to 40% that of granular sucrose on a volume basis.

References Cited in the file of this patent

UNITED STATES PATENTS

| | | |
|---|---|---|
| 2,761,783 | Ferguson | Sept. 4, 1956 |
| 2,854,341 | Waldo | Sept. 30, 1958 |
| 2,876,105 | Jucaitus et al. | Mar. 3, 1959 |
| 3,014,801 | Evans | Dec. 26, 1961 |